United States Patent [19]
Ohno et al.

[11] Patent Number: 5,099,497
[45] Date of Patent: Mar. 24, 1992

[54] POLARITY DETECTOR FOR SUBSCRIBER LINES

[75] Inventors: Kohichi Ohno, Yokohama; Yukio Furukawa, Kawasaki, both of Japan

[73] Assignee: Fujitsu Limited, Kawasaki, Japan

[21] Appl. No.: 551,292

[22] Filed: Jul. 12, 1990

[30] Foreign Application Priority Data

Jul. 17, 1989 [JP] Japan .................... 1-182626

[51] Int. Cl.⁵ .................... H04L 25/49; H04L 25/34
[52] U.S. Cl. .................... 375/20; 375/19; 371/56
[58] Field of Search ............ 375/20, 19, 17; 371/56; 341/56, 57, 58

[56] References Cited

U.S. PATENT DOCUMENTS

| | | | |
|---|---|---|---|
| 3,560,856 | 2/1971 | Kaneko .................... | 375/19 |
| 4,003,041 | 1/1977 | van Duuren et al. ........ | 375/19 |
| 4,910,750 | 3/1990 | Fisher .................... | 375/20 |

OTHER PUBLICATIONS

"Integrated Services Digital Network (ISDN)-Basic Access Interface for Use on Metallic Loops for Application on the Network Side of the NT"; American National Standards Institute, Inc., New York, N.Y.; ANSI T1.601-1988 (Approved Sep. 16, 1988).

Primary Examiner—Douglas W. Olms
Assistant Examiner—Ralph Smith
Attorney, Agent, or Firm—Staas & Halsey

[57] ABSTRACT

A polarity detector for subscriber lines in a data transmitting system which detects the polarity of 2-wire subscriber lines using 2B1Q codes. A converter converts a quaternary 2B1Q code into binary code and outputs complementary binary data. A frame synchronizing signal detector detects a binary code frame synchronizing signal in the complementary binary data and outputs a timing signal. A pattern detector detects an all "1"s or "0"s state of the complementary binary data and the timing signal. A selector circuit selects all complementary data having a single polarity in response to all "1"s or "0"s detected by the pattern detector. Therefore, correct data is received by correctly detecting the polarity of the subscriber line.

8 Claims, 11 Drawing Sheets

| | SW | ISW | 2B+D | M |
|---|---|---|---|---|
| TN | REPEAT +3 AND -3(1000) | — | ALL "1" | ALL "1" |
| SN1 | 1010000000010001010 | — | ALL "1" | ALL "1" |
| SN2 | 1010000000010001010 | — | ALL "1" | ALL "1" |
| SN3 | 1010000000010001010 | 00001010100010000 | DATA | DATA |
| TL | REPEAT +3 AND -3(1000) | — | ALL "1" | ALL "1" |
| SL1 | 1010000000010001010 | 00001010100010000 | ALL "0" | ALL "1" |
| SL2 | 1010000000010001010 | 00001010100010000 | DATA | DATA |
| SL3 | 1010000000010001010 | 00001010100010000 | DATA | DATA |

POLARITY DETECTOR FOR SUBSCRIBER LINES

BACKGROUND OF THE INVENTION

The present invention relates to a polarity detector for subscriber lines for detecting a polarity of subscriber lines in a data transmitting system having 2-wire subscriber lines using 2B1Q (two binary—one quaternary) codes.

In the 2B1Q code, "1","1" in binary notation is set to +1 in quaternary notation, "1","0" in binary notation is set to +3 in quaternary notation, "0","1" in binary notation is set to −1 in quaternary notation and "0","0" in binary notation is set to −3 in quaternary notation. Development of a point U interface for an Integrated Services Digital Network (ISDN) using a 2B1Q code as described above has been ongoing. A U interface is a service access point between an office line control unit and a distributed subscriber line control unit. It can be used, for example, as an interface between subscriber lines and a PBX. It is well known in the art. If the connecting polarity of the 2-wire subscriber lines of the point U interface is inverted, when the quaternary code is converted to binary code through polarity inversion, the binary code on the receiving side is different from that on the sending side. Therefore, it is essential to correctly decode the quaternary code by deciding whether or not the connecting polarity of the 2-wire subscriber lines has been inverted.

Development of a 2-wire subscriber line transmission system using the 2B1Q code for an ISDN has been continuing. For instance, in FIG. 1, a subscriber terminal 101 is connected to an office line control unit OCU 103 by a 2-wire subscriber line 104 through a distributed subscriber line control unit DSU 102. The 2B1Q code data is transmitted to the subscriber line 104. The distributed subscriber line control unit 102 and the office line control unit 103, respectively, include interfaces 105 and 110, line controllers 106 and 109, and subscriber line terminators 107 and 108. The line controllers 106 and 109 are provided with functions for multiplexing and demultiplexing control of the subscriber terminators 107 and 108, and functions for code conversion from binary to quaternary code and timing extraction.

FIG. 2 is a chart of sending frames in binary code. A superframe is formed by eight frames from #1 to #8. The period of each frame is 1.5 ms and is formed by an 18 bits inversion frame synchronous signal ISW or a frame synchronous signal SW, 216 bits of 2B+D)×12 data and a 6 bits M channel. 2B+D refers to a basic interface structure in which two B channels and one D channel are provided. The letter B in 2B+D indicates a B channel of 64 Kbps, while the letter D indicates a D channel of 16 Kbps. In FIG. 2, the 2B+D code has 216 bits in which 96 bits are allocated to each of the B channels and 24 bits are allocated to the D channel.

The 2-wire subscriber line transmission system using the 2B1Q code explained above is standardized by the American National Standards Institute Regulation which specifies that a couple of lines are sometimes connected through two inversion lines. It is required that normal data transmission be realized even when the connecting polarity of the 2-wire subscriber lines 104 is inverted.

The subscriber line terminators 107 and 108 of the digital subscriber system shown in FIG. 1 are shown in more detail in FIG. 3. The office line control unit (OCU) 103 is connected to a TIP terminal and a RING terminal of the subscriber line 104 through a hybrid transformer 1081. The line controller 109 assembles the data sent from an exchange to the sending frame having the format shown in FIG. 2 and then sends the frame to the code converter 1083. The code converter 1083 converts a binary non-return-to-zero (NRZ) code sent from the line controller 109 into a quaternary 2B1Q code, amplifies it up to a predetermined level and thereafter, sends it to a balance/unbalance converter 1082.

The balance/unbalance converter 1082 performs a balance/unbalance conversion of the 2B1Q code sent from the code converter 1083 in order to send it through the hybrid transformer 1081 and over the 2-wire subscriber line 104. Thus, the data sent from the exchange is transmitted to the distributed subscriber line control unit 102 through the 2-wire subscriber line 104.

The 2B1Q data from the distributed subscriber line control unit 102 is sent through the 2-wire subscriber unit 104 and the hybrid transformer 1081 and is received by a balance/unbalance conversion circuit 1085. The balance/unbalance conversion circuit 1085 differentially amplifies the signal waveform appearing across the TIP terminal and the RING terminal. The differentially amplified signal on the 2-wire subscriber line is waveform equalized by an equalizing amplifier 1086 and a timing signal is extracted therefrom. The code converter 1087 converts the 2B1Q code data sent from the equalizing amplifier 1086 into binary NRZ data based on the extracted timing signal and sends it to the line controller 109. The line controller 109 demodulates the binary NRZ data sent from the code converter 1087 (in the sending frame format shown in FIG. 2) and sends it to an exchange through an interface 110. Each section of the distributed subscriber line control unit 102 operates in the same way as the office line control unit 103. When the TIP and RING terminals of the 2-wire subscriber line 104 are inversely connected, the balance/unbalance converter 1085 outputs inverted 2B1Q code data since it differentially amplifies the signal.

FIG. 4 is a timing diagram for the operation of the circuit shown in FIG. 3. The waveform A in FIG. 4, which is the 2B1Q code under normal polarity, is changed to the waveform B by inverting the connecting polarity of the TIP and RING terminals of the subscriber line 104. Therefore, the binary code obtained by receiving and decoding the waveform A is quite different from the binary code obtained by receiving and decoding the waveform B. Accordingly, it is necessary to receive correct data. This is accomplished by detecting the connecting polarity of the subscriber line.

SUMMARY OF THE INVENTION

It is an object of the present invention to detect the polarity of subscriber lines using a simplified structure.

The above object and other objects are obtained by providing a polarity detector for subscriber lines in a system which transmits a quaternary 2B1Q code over subscriber lines. The polarity detector includes a code converter for converting the quaternary 2B1Q code into binary codes and outputting complementary binary data as a training pattern. A frame synchronizing signal detector detects a frame synchronizing signal in binary code for the code converter. Pattern detectors detect all "1"s or "0"s of the training pattern with a timing signal from the frame synchronizing signal detector. A selector selects all data having a single polarity from the training pattern in response to the pattern detector detecting all "1"s and "0"s.

DESCRIPTION OF THE PREFERRED EMBODIMENTS

Figure 4:
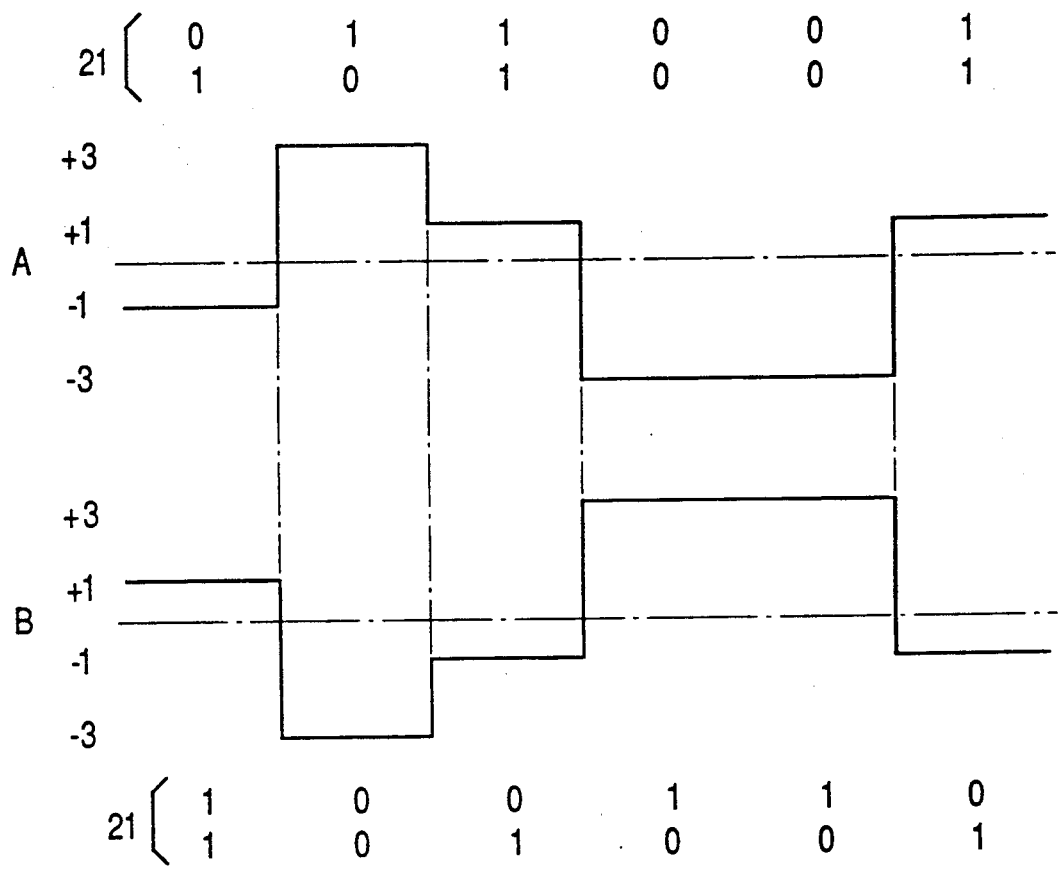
FIG. 4 is a timing diagram for the 2B1Q code.

A polarity detector for subscriber lines according to the present invention detects the polarity of the subscriber lines using a training pattern. The polarity detector of the present invention will be explained with reference to FIG. 5. A code converter 1 directly converts a quaternary 2B1Q code received from the subscriber lines into a binary code to obtain a positive binary data RD+ (received data). The code converter 1 also inverts the received 2B1Q code and then converts the inverted 2B1Q code into a binary code to obtain a negative binary data RD−. That is, the code converter 1 outputs complementary binary data RD+ and RD− when a training pattern is received. For example, when the code converter 1 receives the A pattern of the 2B1Q code (shown in FIG. 4) from the subscriber lines, it converts the A pattern into positive binary data RD+. At the same time, the code converter 1 inverts the A pattern and produces the B pattern. The B pattern is then converted into negative binary data RD−.

A synchronizing signal detector 2 detects the frame synchronizing signal of the binary code data of either positive binary data RD+ or negative binary data RD− sent from the code converter 1. Pattern detectors 3 and 4 detect whether the complementary data RD+ and RD− sent from the coder converter 1 are set to predetermined all "1"s or "0"s in synchronization with detection of frame synchronizing signals from the synchronizing signal detector 2. A selector 5 selects the data having a single polarity of the complementary data RD+ and RD− sent from the code converter 1 along with detected outputs from the pattern detectors 3 and 4.

It is also possible to form a device in which the selector 5 is controlled by detecting whether or not the inverted frame synchronizing signal and the frame synchronizing signal of the training pattern from the synchronizing signal detector 2 are in a predetermined sequence. Moreover, the synchronizing signal detector 2 may also be integrated in common with a frame synchronizing protection circuit.

Figure 2:
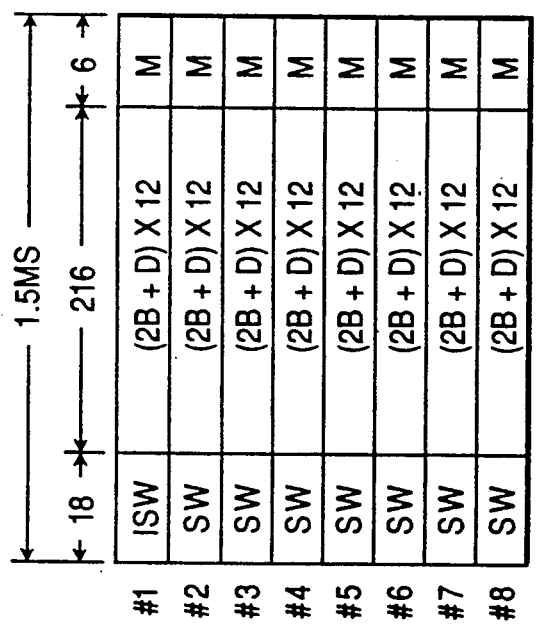
FIG. 2 is a diagram of a super frame on the subscriber line in FIG. 1.

The code converter 1 converts quaternary code and inverted quaternary code into positive and negative binary codes and outputs complementary data RD+ and RD−. The frame synchronizing signal is detected in the synchronizing signal detector 2 using RD+, for example, and the 216 bits data and the 6 bits M channel data of the training pattern shown in FIG. 2 become all "1"s or "0"s. Therefore, the pattern detectors 3 and 4 detect all the "1"s or "0"s. When all "1"s are detected in the pattern detector 4, that is, when the data of the training pattern is set to all "1"s, the inverted polarity of the subscriber line is detected since the data RD− is correct data. Therefore, the selector 5 selectively outputs the data RD− as the received data RD.

Figure 6:
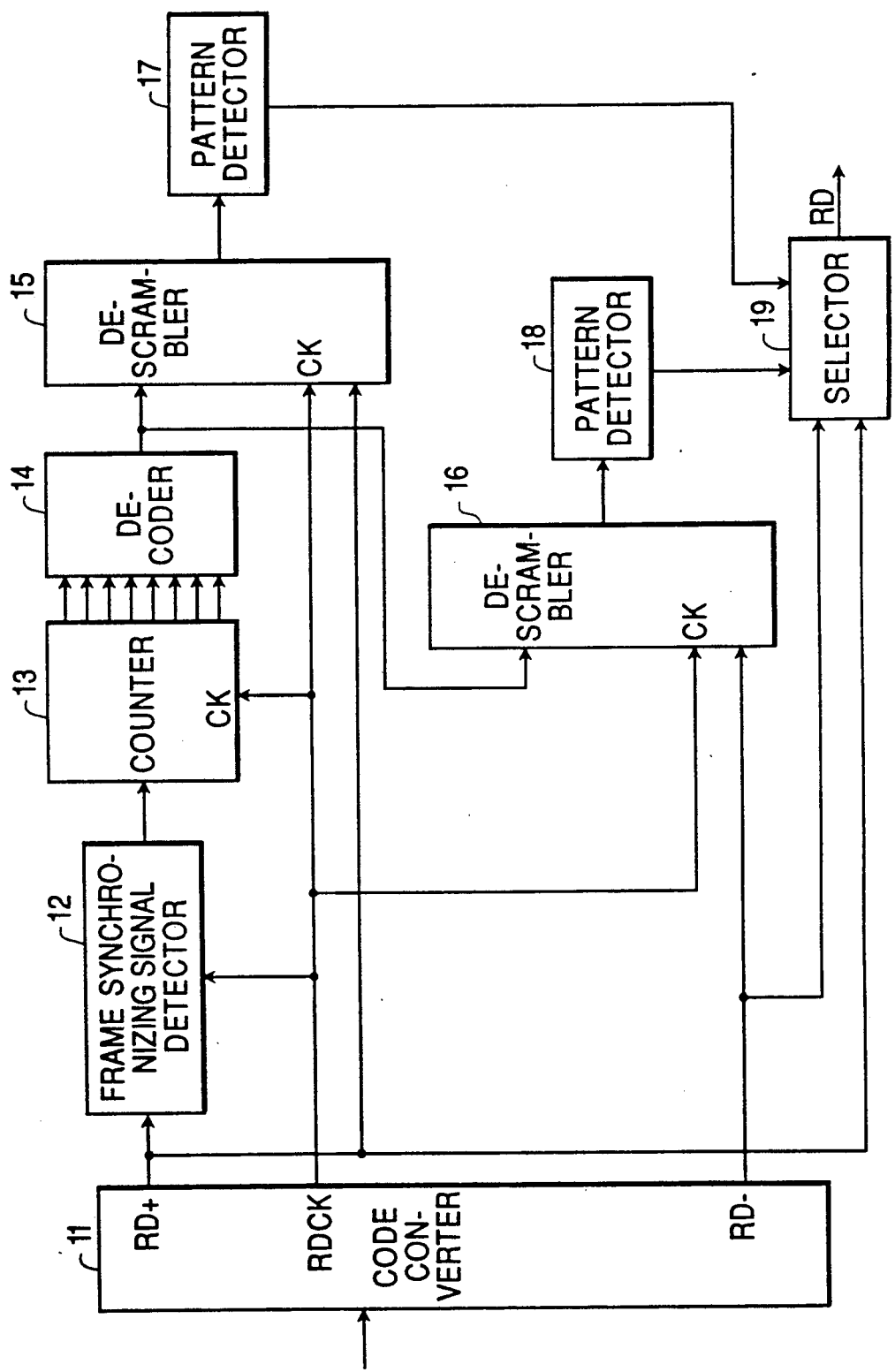
FIG. 6 is a block diagram of a first embodiment according to the present invention.

FIG. 6 is a block diagram of a first embodiment according to the present invention. Reference numeral 11 designates a code converter which converts quaternary code into binary code and outputs complementary data RD+ and RD−, and a clock signal RDCK. The clock signal RDCK is extracted from the received data and is used to convert received quaternary code into binary code (NRZ data) in the code converter 11. The clock signal RDCK is in synchronism with the data RD+ and RD−.

Included in the code converter 11, but not shown, is a frame synchronization circuit, which generally includes a frame synchronizing signal detector, a frame synchronization protection unit and a hunting circuit for searching a real frame synchronizing signal. The frame synchronization circuit synchronizes the clock signal RDCK with a clock signal extracted from a received 2B1Q code.

Reference numeral 12 designates a frame synchronizing signal detector which detects the frame synchronizing signal from the binary code data. Reference numeral 13 designates a 240-step counter which counts the clock signals RDCK. Reference numeral 14 designates a decoder which outputs an enable signal for descrambling 2B+D bits and M bits. Reference numerals 15 and 16 designate descramblers which descramble the complementary data RD+ and RD−. Reference numerals 17 and 18 designate pattern detectors which detect all "1"s or "0"s of the complementary data RD+ and RD−. Reference numeral 19 designates a selector.

Figure 5:
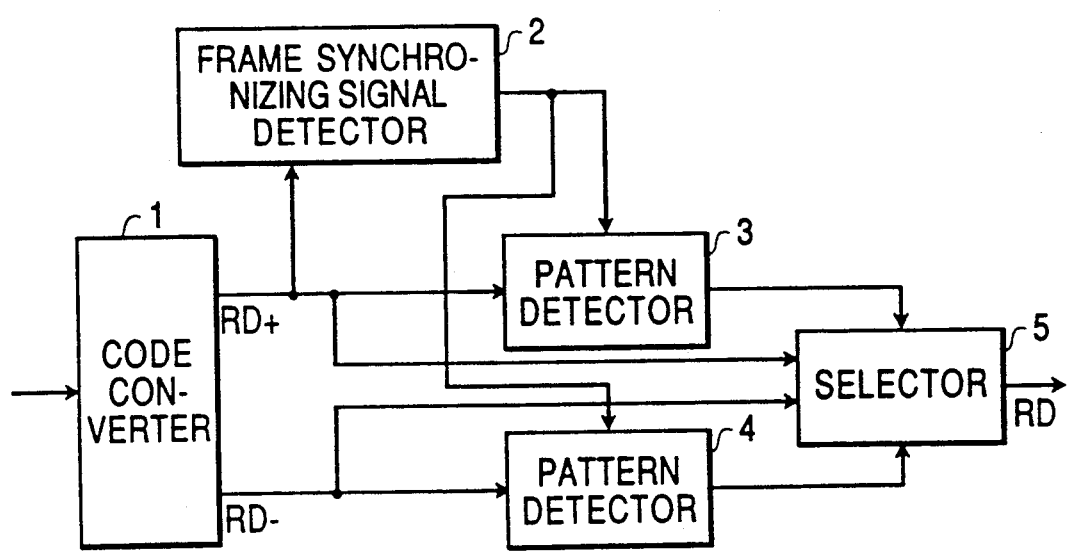
FIG. 5 is a block diagram of the present invention.

The pattern detectors 3 and 4 in FIG. 5 correspond to a structure formed by the descramblers 15 and 16 and the pattern detectors 17 and 18. The frame synchronizing signal detector 12 may be constructed to detect the frame synchronizing signal included in the data having any single polarity of the complementary data RD+ and RD−. The descramblers 15 and 16 descramble the data, except for the frame synchronizing signal, in the sensing side.

The counter 13 is formed as a 240-step structure because one frame is formed with 240 bits. The counter 13 counts the clock signal RDCK when "0" is loaded by the detected signal of the frame synchronizing signal. The counted value is applied to a decoder 14. The decoder 14 applies the enable signal to the descramblers 15 and 16 during a period 222 bits after an initial 18 bits of one frame is excluded. Accordingly, the descrambling is carried out in the descramblers 15 and 16, excluding the frame synchronizing signal.

The polarity of the bits is determined by detecting all "1"s or "0"s in the descrambled 2B+D bits and M bits in the pattern detectors 17 and 18. The pattern detectors 17 and 18 may be realized with simple logic circuits. The selector 19 is controlled depending on the detection result. Any one of the data RD+ and RD— is output as the receiving data RD and the detection result is maintained until the end of communication.

Figure 1:
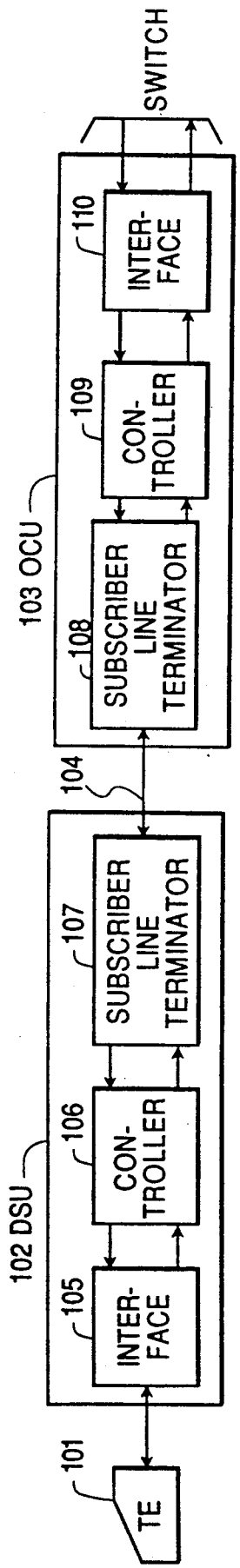
FIG. 1 is a block diagram of a digital subscriber line system.
Figure 3A:
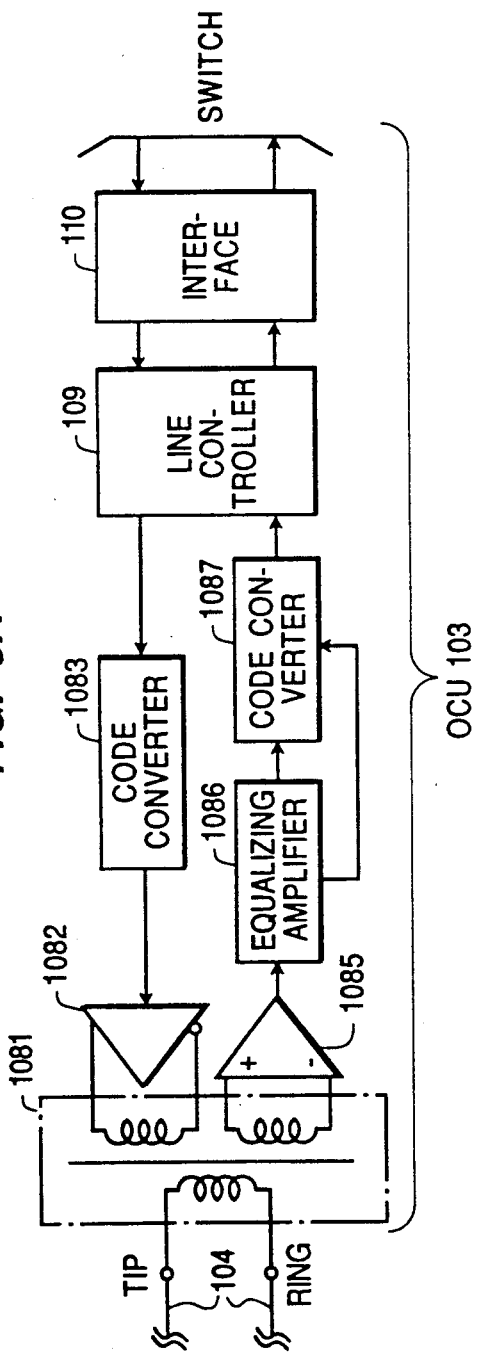
FIG. 3A and 3B are detailed block diagram of a 2-wire subscriber line and subscriber line terminator in FIG. 1.
Figure 3B:
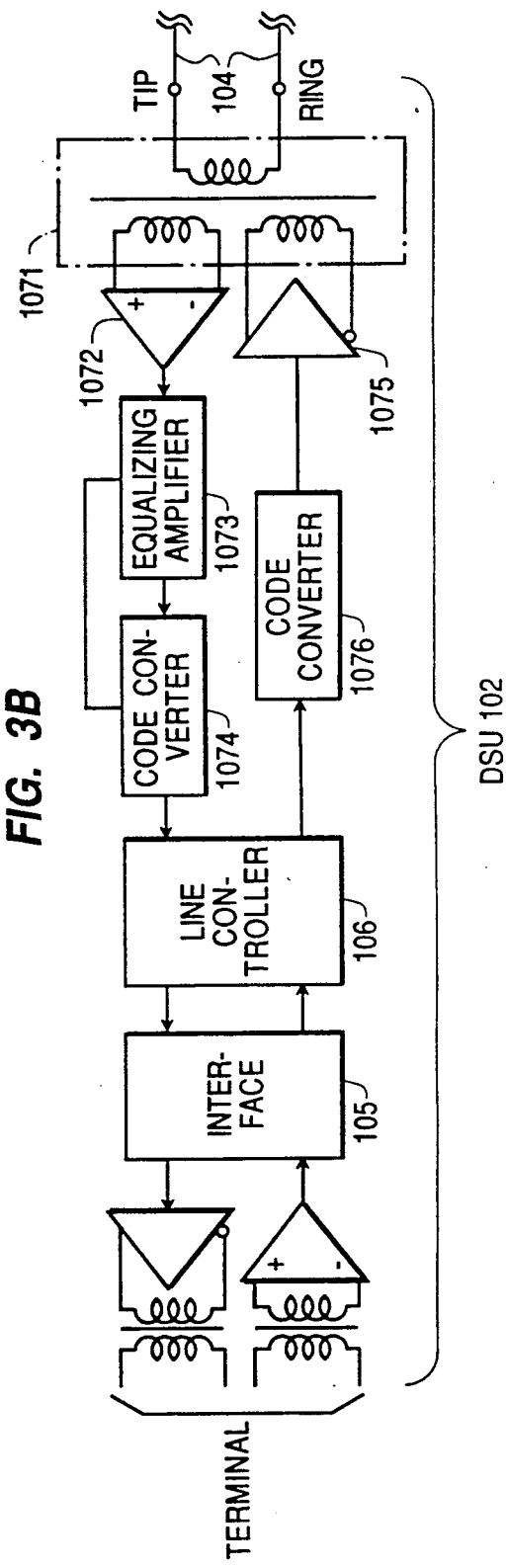

The structure of each circuit may be realized by logic circuits and microprocessors, etc. The code converters 1074 and 1087 (refer to FIGS. 1 and 3), in the subscriber line terminators 107 and 108 in the digital subscriber line system, determine the polarity of the data.

Figures 7, 8:
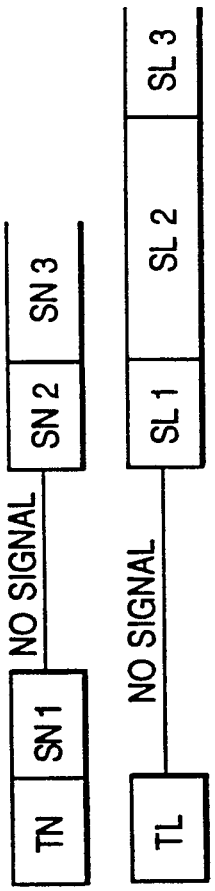
FIG. 7 is a timing diagram of a training pattern.
FIG. 8 is a diagram of a signal pattern.

FIG. 7 is a diagram explaining the training pattern. Signals TN and SN1 are transmitted to the office line control unit 103 from the distributed subscriber line control unit 102 to set up a no-signal state. Thereafter, signals SN2 and SN3 are also transmitted. A signal TL is transmitted to the distributed subscriber line control unit 102 from the office line control unit 103 to set up a no-signal state. Then, signals SL1, SL2 and SL3 are also transmitted. During a no-signal period after the signals have been transmitted, an echo canceller (not shown) is connected.

The signals SN1 and SL1 are transmitted when communication is started under an initial condition, that is, at a so-called cold start time. When communication is completed, an equalizing circuit or echo canceller (neither are shown) maintains a converged state. A signal is not transmitted when communication is started under a so-called warm start time.

FIG. 8 is a diagram for explaining a signal pattern. The signals TN and TL form a repeated pattern of +3 and —3 in quaternary notation or "1000"in binary notation. On the other hand, the signals SN1, SN2 and SL1 have a frame structure including a frame synchronizing signal SW of +3, +3, —3, —3, +3, —3, +3, +3 in quaternary notation and all "1"s in 2B+D bits and M bits. Signals SN3 and SL3 have a frame structure including the frame synchronizing signal SW, any one of the inverted frame synchronizing signals ISW (—3, —3, +3, +3, +3, —3, +3, —3, —3), the 2B+D bits and the M bits used as ordinary data. The signal SL2 has a frame structure including any one of the frame synchronizing signal SW, the inverted frame signal ISW, 2B+D bits having all "0"s and M bits having all "1"s.

The polarity detecting operation is started by inputting the signals SN1, SN2, and SN3 or SN2 and SN3 as the training pattern to the office line control unit 103, and inputting the signals SL1, SL2, and SL3 or SL2, and SL3 to the distributed subscriber line control unit 102. A frame synchronizing signal SW or an inverted frame synchronizing signal ISW is then detected using the frame synchronizing signal detector 12. The counter 13 starts counting the clock signal RDCK when the detected signal is received. The decoder 14 adds the enable signal having 2B+D bits and M bits to the descramblers 15 and 16. The descrambled data is added to the pattern detectors 17 and 18, and the signals SN1, SN2, and SL1 having all "1"s are detected.

For example, When the signals SN1, SN2, and SL1 are received, if an all "1"s state (+1 in quaternary notation) is detected in the pattern detector 17, the data in which "0"s and "1"s appear alternately (—1 in quaternary notation) is input to the pattern detector 18. The selector 19 is controlled by the detection signal from the pattern detector 17 and RD— is output as the receiving data RD. When the signal SL2 is received, an all "0"s state is detected only for the 2B+D bits. Although an all "0"s state means quaternary —3, when quaternary —3 is attained through polarity inversion, "1"s and "0"s alternately appear in the binary code and therefore the all "0"s state is not detected.

Accordingly, it becomes possible to automatically detect the connection polarity of the subscriber lines through transmission and reception of a training pattern so that correct data may be received.

Figure 9:
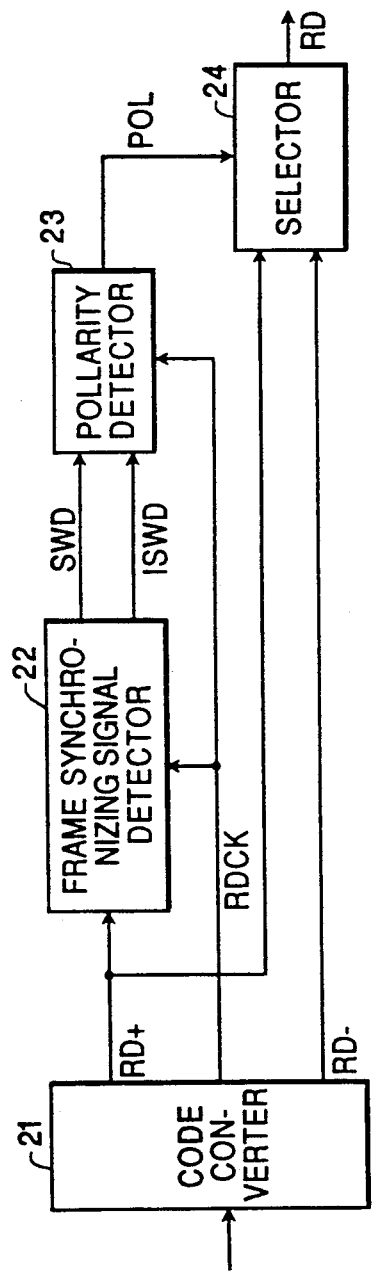
FIG. 9 is a block diagram of a second embodiment according to the present invention.

FIG. 9 is a block diagram of a second embodiment according to the present invention. In FIG. 9, reference numeral 21 designates a code converter, reference numeral 22 designates a synchronizing signal detector, reference numeral 23 designates a polarity detector, and reference numeral 24 designates a selector. It should be noted that the synchronizing signal detector 22 and the polarity detector 23 can be part of a frame synchronizing circuit included in the code converter 21.

In the second embodiment, a frame synchronizing signal SW or an inverted frame synchronizing signal ISW is detected in the frame synchronizing signal detector 22. The data having either of the polarities of the complementary data RD+ and RD— are output from the code converter 21. The detected frame synchronizing signal SWD or the detected inverted frame synchronizing signal ISWD is added to the polarity detector 23. Polarity is detected in accordance with the detection of either the SWD or ISWD signal in a predetermined sequence. The polarity detection signal POL controls the selector 24. Any of the complementary data RD+ and RD— is selected as the receiving data RD and it is then transmitted to the data processor (not illustrated).

Figure 10:
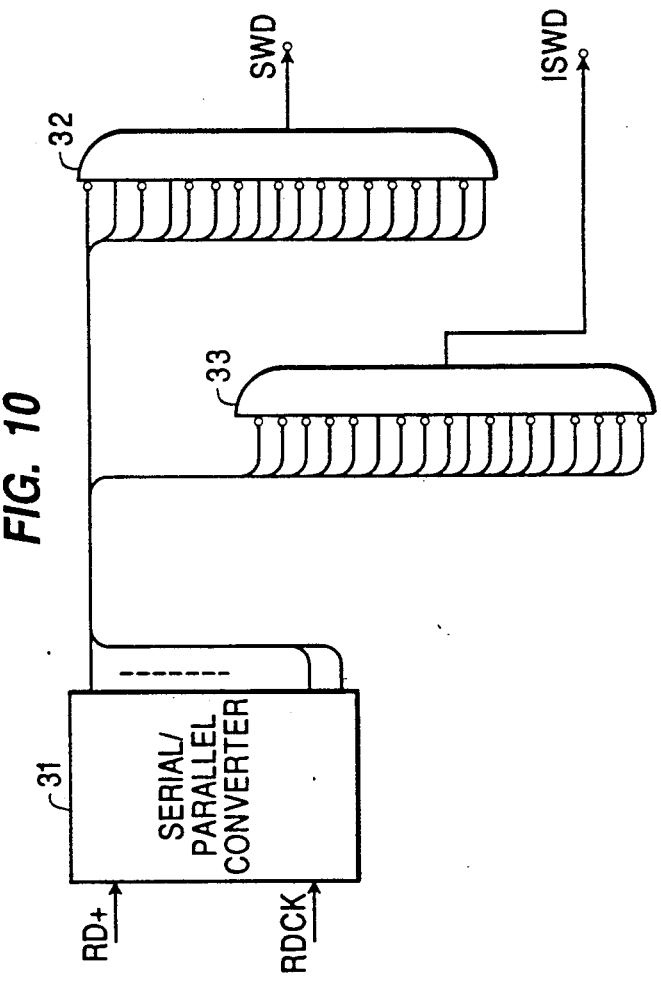
FIG. 10 is a block diagram of the synchronizing signal detector in FIG. 9.

The frame synchronizing signal detector 22 may have the same structure as the synchronizing signal detector 12 shown in the embodiment of FIG. 6. For example, the detector 22 can be formed as shown in FIG. 10. The detector 22 sequentially shifts the data RD+ to a serial/parallel converter 31 in accordance with the clock RDCK to output 18 bits in parallel and then adds such data to the gate circuits 32 and 33. The gate circuit 32 detects the frame synchronizing signal SW shown in FIG. 4. The gate circuit 33 detects the inverted frame synchronizing signal ISW shown in FIG. 8.

Figure 11:
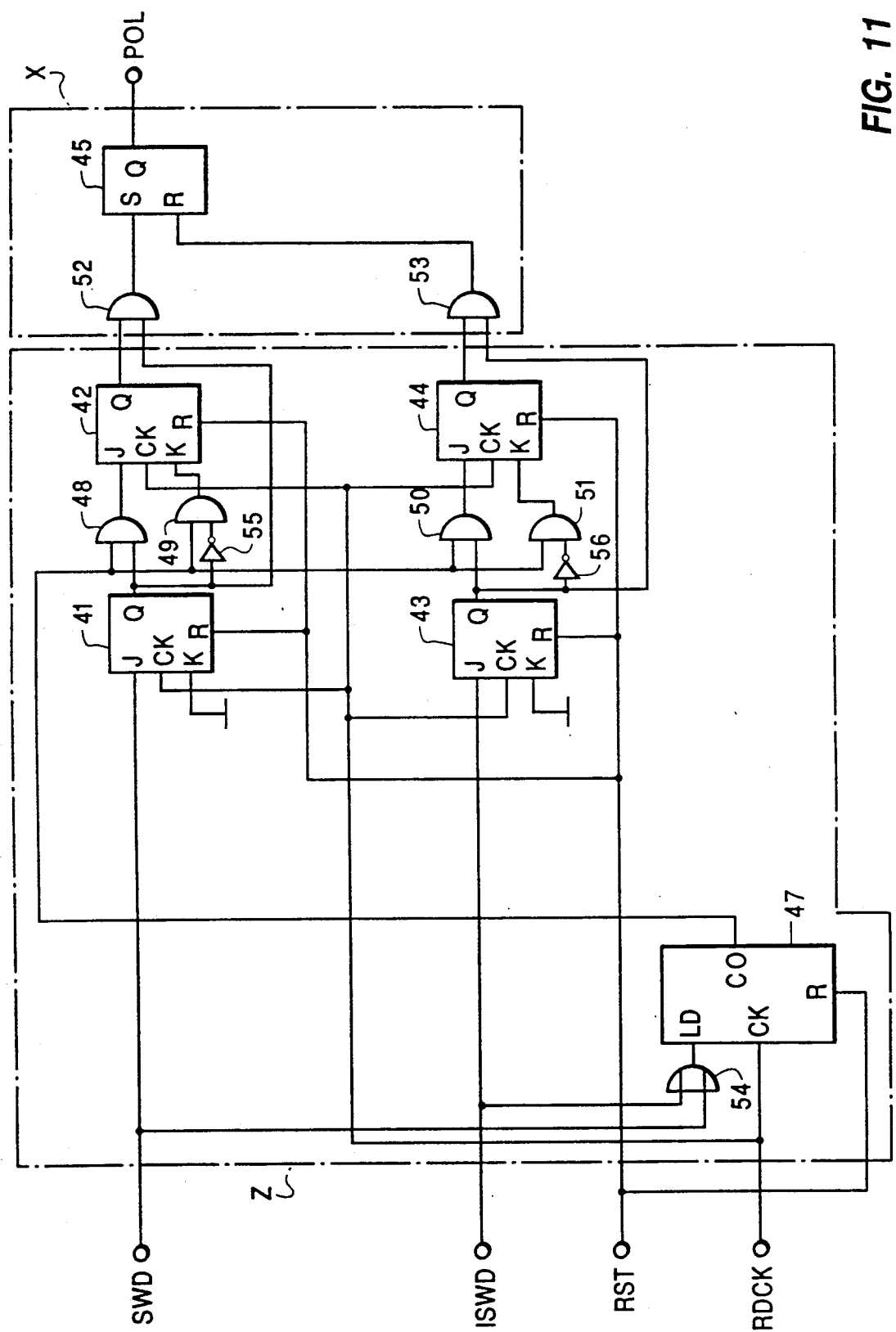
FIG. 11 is a block diagram of a polarity detector in FIG. 9.

The polarity detector 23 can be formed as shown, for example, in FIG. 11. The polarity detector 23 (X, Z) includes flip-flops 41 through 45, an 8 bits counter 47, AND circuits 48 through 53, an OR circuit 54 and inverters 55 and 56. The detected signal SWD of the frame synchronizing signal SW is applied to a load terminal LD of the counter 47 through a terminal J in the flip-flop circuit 41 and the OR circuit 54. The detected signal ISWD from the inverted frame synchronizing signal ISW is applied to a terminal J in the flip-flop 43 and a load terminal of the counter 47 through the OR circuit 54. Moreover, a reset signal RST is applied to the reset terminal R of the flip-flops 41 through 44 and the counter 47 during a initial condition and the clock signal RDCK is applied to the clock terminal CK.

Therefore, during cold start, for example, the frame synchronizing signal SW of the signals SN1 and SL1 is detected. The detected signal SWD of the frame synchronizing signal SW can be continuously obtained two or more times since the inverted frame synchronizing signal ISW is not included. If a second detected signal SWD is obtained 240 bits after the first detected signal SWD, an output signal of the AND circuit 52 becomes "1", the flip-flop 43 is set and the polarity detecting signal POL at the Q output terminal of the flip-flop 45 becomes "1". When the polarity detecting signal POL has the level "1", the selector 24 selects the data RD+ as the receiving signal RD.

Since the connecting polarity of the subscriber line is inverted, the frame synchronizing signal SW is also inverted. The detected signal ISWD of the inverted frame synchronizing signal ISW is continuously obtained two or more times. In addition, when the second detected signal SWD is obtained 240 bits after the first detected signal SWD, an output signal from the AND gate 53 becomes "1", the flip-flop 45 is reset and the polarity detection signal POL becomes "0". Since the polarity detection signal POL becomes "0", the selector 24 selects the data RD− as the receiving signal RD.

If the signal SL2 is received under the warm start condition, the frame synchronizing signal SW is received and the inverted frame synchronizing signal ISW is also received as a super frame synchronizing signal. When the connecting polarity of the subscriber lines is inverted, after the detected signal SWD of the frame synchronizing signal SW is obtained, the detected signal ISWD from the inverted frame synchronizing signal ISW is continuously obtained seven or more times. If the flip-flop 41 is set first, the flip-flops 43 and 44 are then set. Therefore, the flip-flop 45 is reset by the output signal "1" from the AND circuit 53 and the polarity detection signal POL becomes "0".

Figure 12:
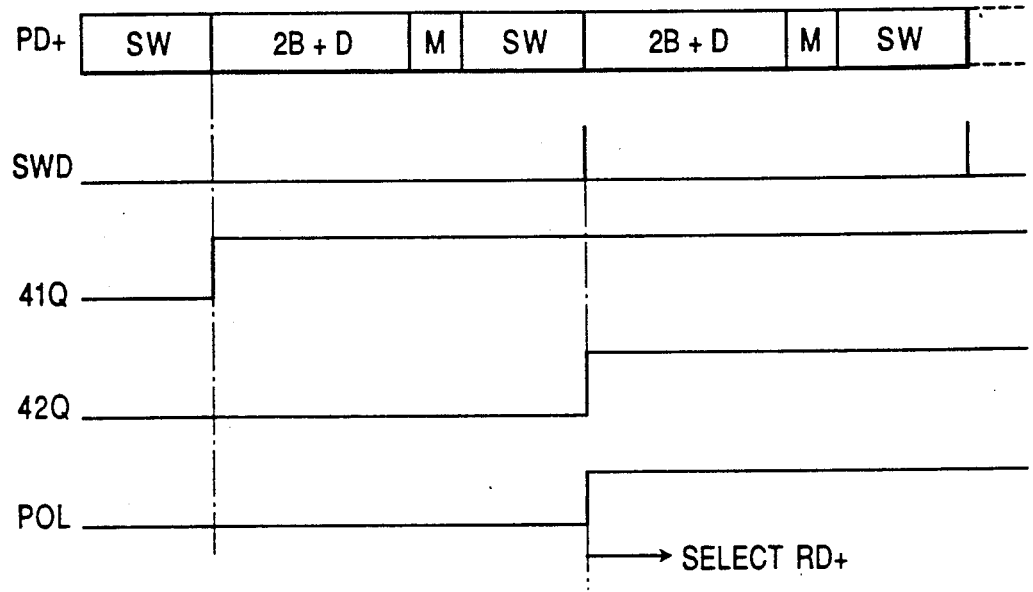
FIGS. 12 and 13 are diagrams explaining operations of the second embodiment according to the present invention.
Figure 13:
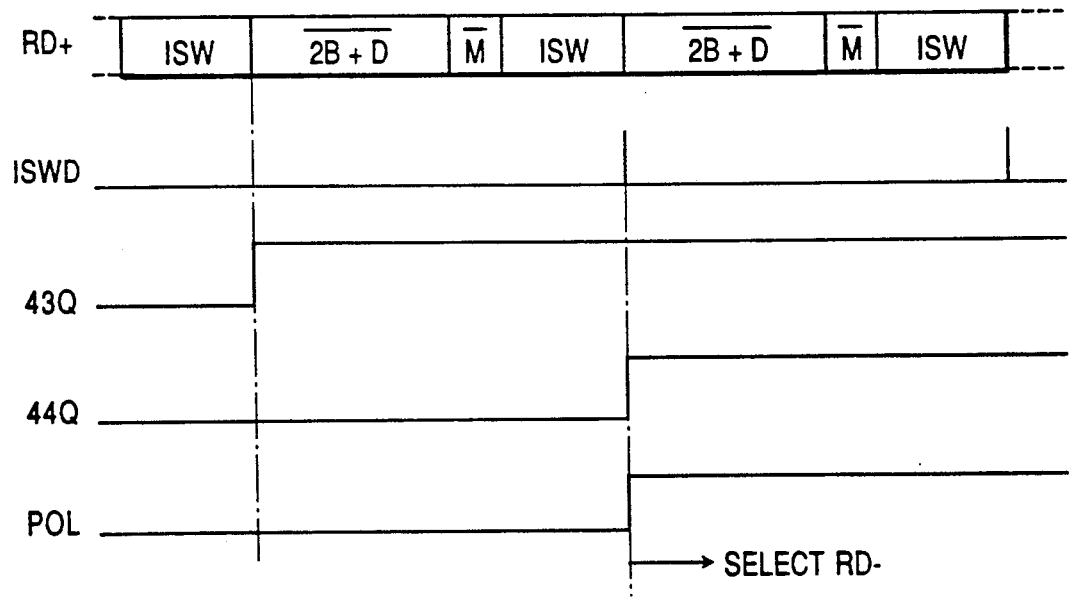

FIGS. 12 and 13 are diagrams for explaining the operation of the second embodiment explained above. In FIG. 12, the connecting polarity of the subscriber lines is normal. That is, the training pattern has a super-frame structure including 8 basic frames having a frame synchronizing signal SW, 2B+D bits and M bits when RD+ data is received. When the detected signal SWD of the frame synchronizing signal S is continuously obtained for two or more times, the Q terminals 41Q and 42Q of the flip-flop 41 and 42, respectively, output a "1" and the polarity detecting signal POL becomes "1".

In FIG. 13, the connecting polarity of the subscriber lines is inverted. The frame synchronizing signal SW is received a the inverted frame synchronizing signal ISW and 2B+D bits and M bits are also inverted. When the detected signal ISWD of the inverted frame synchronizing signal ISW is continuously obtained two or more times, it becomes the output at the Q terminals 43Q and 44Q of the flip-flops 43 and 44, respectively. Since the polarity detecting signal POL becomes "0", the data RD− is selected.

Figure 14:
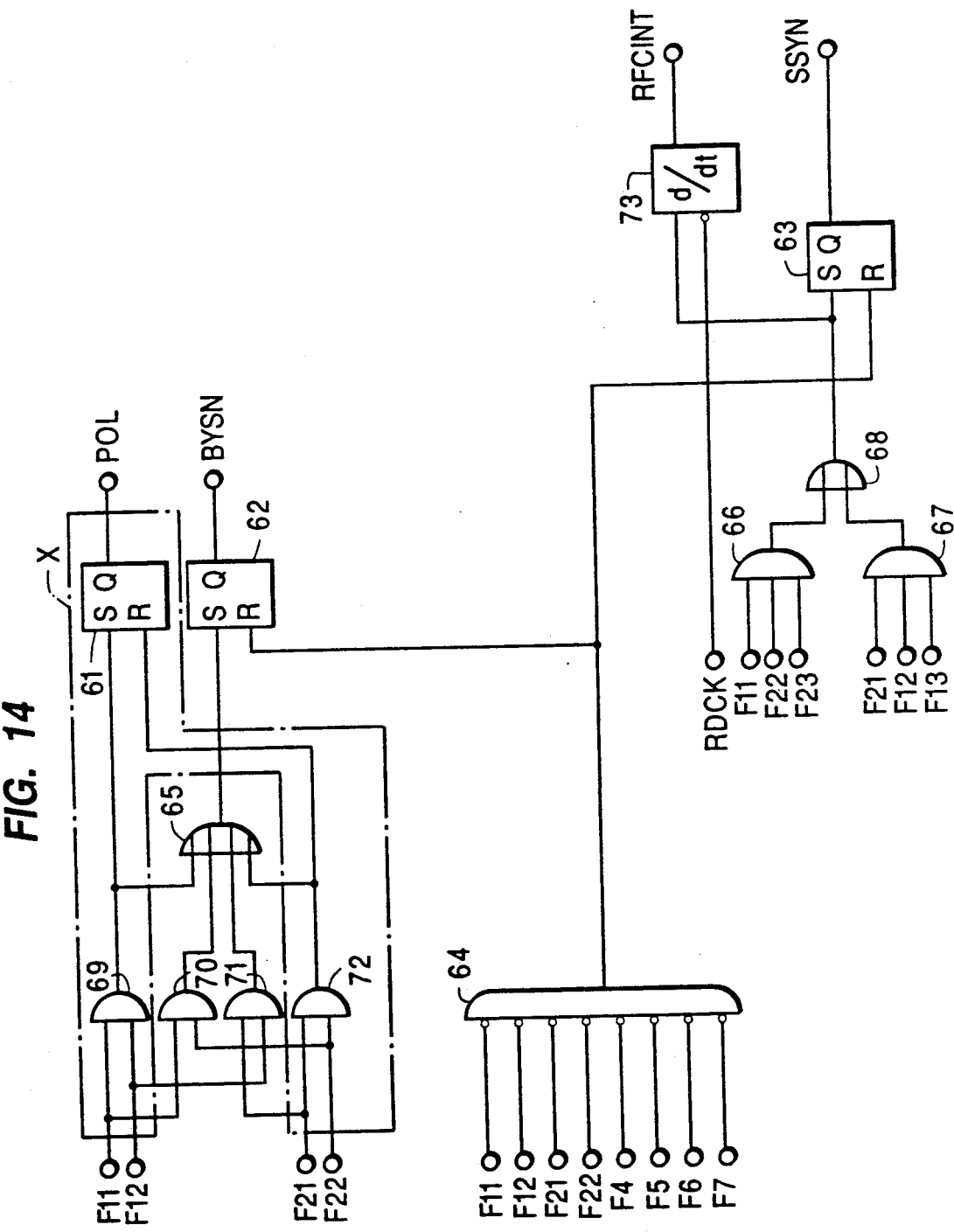
FIGS. 14 and 15 are block diagrams of a third embodiment according to the present invention.
Figure 15:
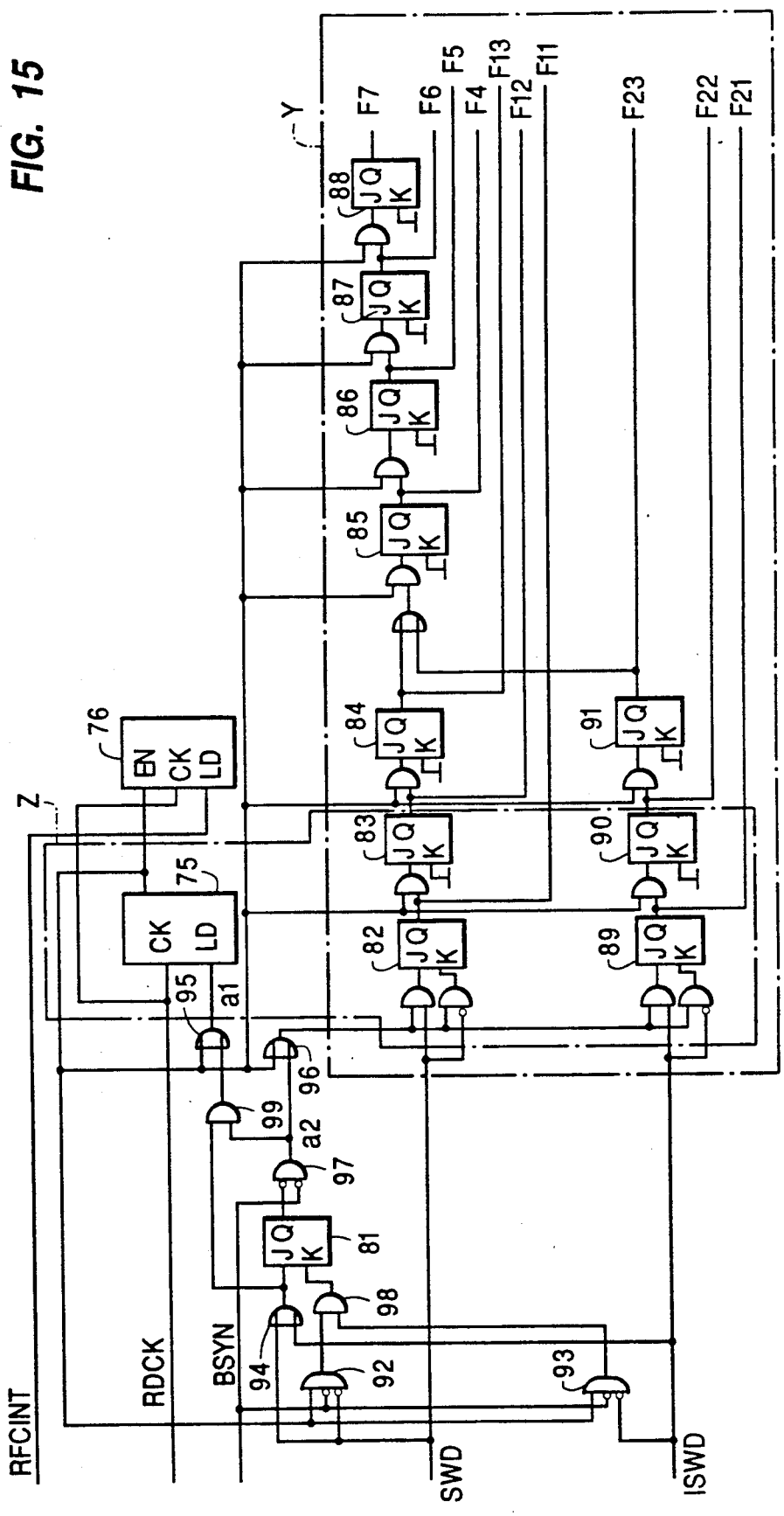

Accordingly, the polarity of the subscriber lines can be decided by detecting the frame synchronizing signal SW and the inverted frame synchronizing signal ISW in the training pattern. FIGS. 14 and 15 are detailed block diagrams of a third embodiment according to the present invention. Reference numerals 61 through 63 designate flip-flops, reference numerals 64 through 72 designate gate circuits, and reference numeral 73 designates a differentiation circuit (d/dt). Reference numerals 81 through 91 designate flip-flops, reference numerals 92 through 99 designate gate circuits, reference numeral 75 designates a 240-step basic frame counter, and reference numeral 76 designates an octonary super frame counter. The super frame counter 76 is an 8-step counter that counts 8 carry signals to detect a first bit of each super-frame.

The third embodiment shown in FIG. 14 is a structure in which the polarity detector 23 (X) and a part of a frame synchronizing protection circuit are used in common. The detected signal SWD of the frame synchronizing signal SW sent from the synchronizing signal detector 22 (refer to FIGS. 9 and 10), the detected signal ISWD of the inverted frame synchronizing signal ISW and a clock signal RDCK are input. A polarity is detected by flip-flops 82, 83, 89, 90 and 61, as shown in FIG. 15. The flip-flops 82, 83, 89, and 90 (FIG. 15) correspond to the flip-flops 41 and 44 shown in FIG. 11, while the flip-flop 61 (FIG. 14) corresponds to the flip-flop 45 shown in FIG. 11. The flip-flop 61 and the logic circuits 69 and 72 form a polarity detector circuit (X-FIG. 14).

The flip-flop 62 outputs a synchronization establishing signal BSYN of the basic frame. The flip-flop 63 outputs a synchronization establishing signal SSYN of the super frame. The set signal of the flip-flop 63 is differentiated by a differentiation circuit 73. The output signal RFCINT from the differentiation circuit 73 is loaded into a counter 76 (see FIG. 15). The output signals F4 through F7, F11 through F13, and F21 through F23 from flip flops 82 through 91 (FIG. 15) are applied to the gate circuits 64, 66, 67, and 69 through 72 (FIG. 14).

In FIG. 15, a frame synchronization protection circuit having seven states is provided. The frame synchronization protection circuit includes flip-flops 82–91, as noted above. When a frame synchronizing signal detector as shown in FIG. 10 detects a frame synchronizing signal twice in a row as determined by flip-flops 11 and 12 (FIG. 6) or 21 and 22 (FIG. 9), the flip-flop 62 in FIG. 14 determines that frame synchronization is achieved. In contrast, when the frame synchronizing signal detector in FIG. 10 does not detect a frame synchronizing signal seven times in a row, the AND gate 64 determines that frame synchronization is not achieved.

As is shown in FIG. 11, a polarity on the subscriber lines is detected using the flip-flops 11, 12, 21 and 22. That is, when a frame synchronizing signal detector continuously detects a frame synchronizing signal two times, the flip-flop 61 can determine the polarity of the signal on the subscriber lines.

Also in FIG. 15, flip-flops 82, 83, 89, 90 and 75 form a polarity detector (Z). As shown, portions of the polarity detector and the frame synchronization protection circuit (Y) including flip-flops 82–91 can be used in common.

Figure 16:
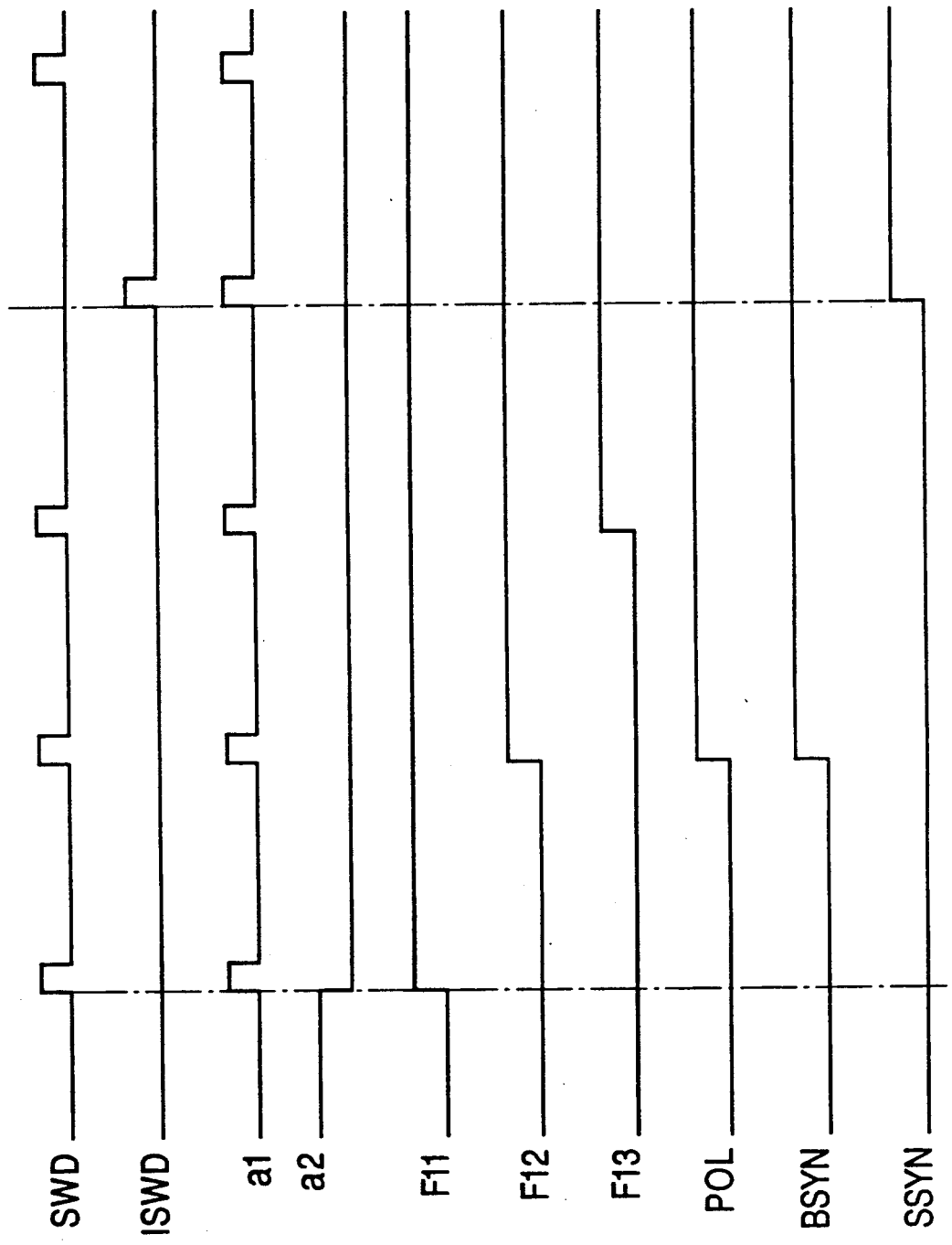
FIG. 16 is a timing diagram for explaining the operation of the third embodiment of the present invention shown in FIGS. 14 and 15.

FIG. 16 is a timing diagram for explaining the operations of the circuits shown in FIGS. 14 and 15. The waveforms are identified by the signals shown in FIGS. 14 and 15. When the detected signal SWD of the frame synchronizing signal SW and the detected signal ISWD of the inverted frame synchronizing signal ISW are input as indicated in FIGS. 14 and 15, an output signal a1 from the gate circuit 95 changes as shown in FIG. 16 and is input to the counter 75. An output signal a2 from the gate circuit 97 becomes "0" because the flip-flop 81 is set by the first detected signal SWD. The flip-flop 82 is also set and its output signal F11 becomes "1".

When the second detected signal SWD is applied, the flip-flop 83 is set and its output signal becomes "1". Therefore, the output signals F11 and F12 are "1". An output signal from the gate circuit 69 also becomes "1", and sets the flip-flop 61 which outputs the polarity detecting signal POL which becomes "1". Thus, the polarity of the subscriber lines is normal and the data RD— is selectively output by the selector (not illustrated). Moreover, since the flip-flop 62 is also set, the synchronization establishing signal BSYN of the basic frame becomes "1".

When a third detected signal SWD is applied, the flip-flop 84 is set and its output signal F13 becomes "1". When the detected signal ISWD of the next frame synchronizing signal ISW is applied, the flip-flop 89 is set and its output signal F21 becomes "1". Therefore, an output signal from the gate circuit 67 becomes "1", the flip-flop 63 is set and the synchronization establishing signal SSYN of the super frame becomes "1".

When the frame synchronizing signal SW and the inverted frame synchronizing signal ISW are not detected, output signals F11, F12, F21, F22, and F4 through F7 of the flip-flops 82, 83, 89 through 91, and 85 through 88 become all "0", and an output signal from the gate circuit 64 becomes "1" indicating an out-of-phase condition. Therefore the flip-flops 62 and 63 are reset and the synchronization establishing signals BSYN and SSYN become "0".

Since the connecting polarity of the subscriber lines is inverted, when the detected signal ISWD is continuously applied, flip-flops 89 through 91 and 85-88 are sequentially set. In addition, an output signal from the gate circuit 72 becomes "1" and resets the flip-flop 61. The polarity detecting signal POL becomes "0" and the synchronization establishing signal BSYN is output. Since the flop-flop 82 is set by the detected signal SWD corresponding to detection of the inverted frame synchronizing signal ISW, the synchronization establishing signal SSYN is also output.

Accordingly, a part of the circuit structure may be used in common to output the polarity detecting signal POL of the subscriber lines. When synchronization is established, the synchronization establishing signals BSYN and SSYN may be output when the polarity of the subscriber lines is normal or when it is inverted. The number of stages for detecting whether synchronization exists is dependent on the conditions of the subscriber lines in each system.

According to the embodiments explained above, the frame synchronizing signal of the binary code data having one polarity of complementary data RD+ and RD— from the code converter 1, and an all "1"s or "0"s state of the training pattern are synchronously detected by the pattern detectors 3 and 4. The selector 5 is controlled to use the detected polarity of the data having all "1"s or "0"s. Here, the code converter 1 and the synchronizing signal detector 2 are necessary for handling the 2B1Q code in the receiving side. Accordingly, the embodiments provide an advantage that the polarity of the subscriber lines may be automatically detected using the training pattern with only the addition of pattern detectors 3 and 4 which have a simplified structure.

When the frame synchronizing signal is in the training pattern, the frame of the frame synchronizing signal SW appears after the frame of the inverted frame synchronizing signal ISW. Therefore, when the frame synchronizing signal SW is detected at least two or more times, the polarity is determined to be normal. When the inverted frame synchronizing signal ISW is detected at least two or more times, the polarity is determined to be inverted. The structure for determining the polarity may be attained by adding the polarity detector 23 which has a simplified structure.

A circuit structure for detecting the polarity of the subscriber lines may be realized economically by commonly using a polarity detector (X,Z) and part of a synchronization protection circuit (Y).

The foregoing is considered illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. A polarity detector for subscriber lines in a system for transmitting a quaternary 2B1Q code over the subscriber lines, said polarity detector comprising:

code converter means for converting the quaternary 2B1Q code received through the subscriber lines into binary codes for outputting complementary binary data;

frame synchronizing signal detector means for detecting and outputting a frame synchronizing signal in the complementary binary data output from said code converter means and outputting a timing signal;

pattern detector means for detecting all "1"s or "0"s of the complementary binary data output from said code converter and a timing signal from said frame synchronizing signal detector means; and selector means for selecting all complementary binary data having a single polarity from the complementary data pattern output from said code converter means in response to a detection of all "1"s or "0"s by said pattern detector.

2. A polarity detector for subscriber lines in a system for transmitting 2B1Q code, obtained by converting binary code into quaternary code, over subscriber lines, comprising:

code converter means for converting quaternary 2B1Q code received through said subscriber lines into positive and negative binary codes and outputting complementary binary data;

frame synchronizing signal detector means for detecting a frame synchronizing signal in binary code data from said code converter means;

polarity detector means for detecting whether the frame synchronizing signal of the positive and negative binary codes in the complementary binary data is detected in a predetermined sequence and outputting a detection signal; and selector means for receiving the detection signal and selecting one of the complementary binary data from said code converter.

3. A polarity detector for subscriber lines according to claim 2, wherein said frame synchronizing signal detector means includes a frame synchronizing signal detecting circuit and wherein said polarity detector means continuously detects the frame synchronizing signal a predetermined number of times.

4. A polarity detector for subscriber lines in a system for transmitting a quaternary 2B1Q code over the subscriber lines, said polarity detector comprising:

code converter means for receiving the quaternary 2B1Q code over the subscriber lines and for converting the quaternary 2B1Q code into binary code and outputting complementary binary data;

frame synchronizing signal detector means for receiving the complementary binary data, detecting a frame synchronizing signal in the complementary binary data and outputting a frame synchronizing signal;

pattern detector means for detecting an all "1"s or "0"s state of the complementary binary data and the frame synchronization signal; and selector means for selecting all complementary binary data having a single polarity in response to the detection of an all "1"s or "0"s state.

5. A polarity detector as set forth in claim 4, wherein said code converter means outputs clock signals, further comprising:

counter means for counting the clock signals; and decoder means for outputting are enable signal in accordance with a predetermined count value.

6. A polarity detector as set forth in claim 5, wherein said pattern detector means comprises:

descrambler means for descrambling the complementary binary data upon receipt of the enable signal; and pattern detectors, connected to said descrambler means, for detecting all "1"s or "0"s in the descrambled binary data.

7. A polarity detector as set forth in claim 6, wherein said frame synchronizing signal detector means comprises:

a serial to parallel converter, connected to receive the complementary binary data and the clock signals, for outputting parallel bits in accordance with the clock signals; and gate means for receiving and adding the parallel bits.

8. A polarity detector as set forth in claim 7, wherein said gate means further detects the frame synchronizing signal and an inverted frame synchronizing signal.

* * * * *